(12) United States Patent
Taylor et al.

(10) Patent No.: US 9,403,228 B2
(45) Date of Patent: Aug. 2, 2016

(54) METHOD AND APPARATUS FOR PULSED ELECTROCHEMICAL GRINDING

(71) Applicant: Faraday Technology, Inc., Clayton, OH (US)

(72) Inventors: E. Jennings Taylor, Troy, OH (US); Maria E. Inman, Yellow Springs, OH (US)

(73) Assignee: FARADAY TECHNOLOGY, INC., Clayton, OH (US)

( * ) Notice: Subject to any disclaimer, the term of this patent is extended or adjusted under 35 U.S.C. 154(b) by 195 days.

(21) Appl. No.: 14/445,586

(22) Filed: Jul. 29, 2014

(65) Prior Publication Data

US 2016/0031026 A1 Feb. 4, 2016

(51) Int. Cl.
*B23H 5/08* (2006.01)

(52) U.S. Cl.
CPC .............. *B23H 5/08* (2013.01); *B23H 2300/12* (2013.01); *B23H 2600/12* (2013.01)

(58) Field of Classification Search
CPC ... B23H 5/08; B23H 2300/12; B23H 2600/12
See application file for complete search history.

(56) References Cited

U.S. PATENT DOCUMENTS

| | | | | |
|---|---|---|---|---|
| 3,475,312 A | * | 10/1969 | Inoue | B23H 5/08 204/217 |
| 3,684,673 A | * | 8/1972 | Colwell | B23H 5/08 204/224 M |
| 3,697,403 A | * | 10/1972 | Colwell | B23H 5/08 204/218 |
| 2007/0020918 A1 | * | 1/2007 | Hirokawa | B23H 5/08 438/626 |

FOREIGN PATENT DOCUMENTS

GB        1283083 A  *  7/1972  ............... B23H 3/02

OTHER PUBLICATIONS

Kalpakjian, Serope et al., Manufacturing Processes for Engineering Materials, 2008, 3 pages, Pearson Education, Inc. Upper Saddle River, New Jersey.
Benedict, Gary F., Electrochemical Grinding (ECG), Nontraditional Manufacturing Processes, 1987, (9 pages total) pp. 153-164, Marcel Dekker, Inc., New York, New York.
Rajurkar, K.P et al., New Developments in Electro-Chemical Machining, Annals of the CIRP, 1999, pp. 567-579, vol. 48/2.
Tehrani, A. Fadaie, et al., Overcut in Pulsed Electrochemical Grinding, Proc Instn Mech Engrs., 2000, pp. 259-269, vol. 214.
Wessel, E. Lloyd, Electrochemical Machining of Gun Barrel Bores and Rifling, Naval Sea Systems Command (SEA-0354), Sep. 1978, 62 pages, Louisville, KY.

* cited by examiner

*Primary Examiner* — Nicholas A Smith
(74) *Attorney, Agent, or Firm* — Thompson Hine LLP (57) ABSTRACT

A method and apparatus for electromechanical grinding is provided. An pulsed alternating waveform is applied between an anodic workpiece and cathodic grinding wheel to physically remove and electrochemically remove material from the anodic workpiece.

11 Claims, 6 Drawing Sheets

METHOD AND APPARATUS FOR PULSED ELECTROCHEMICAL GRINDING

FIELD OF THE INVENTION

This invention relates to electrochemical material removal. More specifically, electrochemical grinding methods and apparatus' that includes a mechanical grinding of a workpiece followed by a pulsed electrochemical removal.

BACKGROUND OF THE INVENTION

Electrochemical machining, electrochemical polishing, electrochemical through-mask etching, and electrochemical deburring are all examples of electrochemical material removal processes whereby metal is removed from a workpiece via an electrochemical reaction.

In electrochemical machining, a workpiece and a geometric shape function as electrodes. For example, the workpiece is typically an anode and the geometric shape is typically a cathode or tool electrode. The geometric shape can be a mirror image of a desired shape of the workpiece. During operation, material is typically removed from the workpiece by an anodic electrochemical reaction. An example of an application that employs electrochemical machining processes is in the manufacturing of gun barrels whereby the internal surface is rifled.

Other examples of processes that use an anodic electrochemical reaction to modify a workpiece include electrochemical polishing, electrochemical through-mask etching, and electrochemical deburring.

Electrochemical material removal has strong utility as a manufacturing technology for fabrication of a wide variety of metallic parts and components. Electrochemical machining has numerous advantages relative to traditional machining, for example, applicability to hard and difficult to cut materials, low tool wear, high material removal rate, smooth bright surface finish, and/or production of parts with complex geometry.

Compared to mechanical machining processes where material is typically removed by mechanical cutting and thermal machining processes where material is typically removed by electric discharge machining or laser cutting, electrochemical material removal is a non-contact machining process and typically does not result in a mechanically damaged or thermally damaged surface layer on the machined work piece.

While electrochemical material processes are particularly noted for resulting in a typically superior surface finish compared to mechanical machining processes, the material removal rates are typically less than mechanical machining processes.

Voltage technologies include electrochemical grinding processes that combine mechanical grinding with an anodic electrochemical reaction. For example, in electrochemical grinding a grinding wheel operates as mechanical grinder and a cathode. Electrochemical grinding processes can be advantageous over mechanical grinding alone and electrochemical processes alone because it increases removal rates typically associated with the mechanical grinding, and improves surface finishes typically associated with anodic electrochemical reactions.

During electrochemical grinding, typically, a larger portion of material is removed from the workpiece by an anodic electrochemical reaction (e.g., 90%) and a smaller portion of material (e.g., 10%) is removed from the workpiece by mechanical grinding. Voltage electrochemical grinding can provide surface finishes, typically in the 9 to 20 μinch Ra. For many machining applications improved surface finishes with greater than 1 μinch Ra are required. For example, many military machines (e.g., helicopters or gun systems) are manufactured with new materials that require a high surface finish.

Thus, there is a continued need to maintain and even improve the rapid material removal rates associated with mechanical grinding or electrochemical grinding and obtain even better surface finishes such as those associated with electrochemical machining of <1 μinch Ra.

SUMMARY OF THE INVENTION

One advantage of the invention includes rapid material removal that is near removal rates typically associated with mechanical grinding. Another advantage of the invention includes high surface finishes typically associated with electrochemical material removal. The surface finish can be less than 1 μinch.

Other advantages include lack of a mechanically or chemically damaged surface layers or thermally damaged surface layer due to a reduction in the amount of time that a mechanical grinding force is applied to the workpiece. Other advantages include ease of cutting complex geometries due to the electrochemical removal and lower tool wear due to the reduced time that a mechanical grinding force is applied to the workpiece.

In one aspect, the invention involves a method for electromechanical grinding. The method involves rotating an electrically conductive grinding wheel. The method also involves applying a first voltage between the electrically conductive grinding wheel and an electrically conductive workpiece. The method also involves applying a first force vector towards the electrically conductive workpiece via the electrically conductive grinding wheel to remove material from the electrically conductive workpiece. The method also involves after removing a desired percentage of material from the electrically conductive workpiece: a) applying a second force vector towards the electrically conductive workpiece, the second force vector being less than the first force vector, and b) applying a second voltage between the electrically conductive grinding wheel and the electrically conductive workpiece to further remove material from the electrically conductive workpiece.

In some embodiments, the first voltage is a forward direct voltage or a forward pulse voltage. In some embodiments, the second voltage is a forward pulse followed by a reverse pulse. In some embodiments, the second voltage is a forward pulse followed by a zero pulse followed by a reverse pulse. In some embodiments, a duration of the forward pulse is based on a material of the electrically conductive workpiece. In some embodiments, a duration of the reverse pulse is based an amount of time to depassivate the electrically conductive workpiece.

In some embodiments, a duration of the zero pulse is based on an amount of time to dissipate heat of the electrically conductive workpiece, replenish reacting species, remove reaction products, or any combination thereof. In some embodiments, the first force vector is based on a material of the electrically conductive workpiece. In some embodiments, the second force vector is based on a material of the electrically conductive workpiece.

In some embodiments, roughness average of the workpiece after the electromechanical grinding is about 8 micro-inches, about 4 micro-inches or less than or equal to 1 micro-inch. In some embodiments, the desired percentage of material removal is about 90%, 95% or 99% material removal.

In another aspect, the invention features an apparatus for electromechanical grinding. The apparatus includes an electrically conductive grinding wheel and an electrically conductive workpiece. The apparatus also includes a power source. The power source includes a first control circuit that applies a first voltage to the electrically conductive grinding wheel and the electrically conductive workpiece while a first force is applied toward the electrically conductive workpiece via the electrically conductive grinding wheel until a desired percentage of material is removed from the electrically conductive workpiece, and a second control circuit that, after the desired percentage of material is removed, applies a second voltage between the electrically conductive grinding wheel and the electrically conductive workpiece to further remove material from the electrically conductive workpiece while a second force is applied to the electrically conductive workpiece via the electrically conductive grinding wheel.

In some embodiments, the first voltage is a forward direct voltage or a forward pulse voltage. In some embodiments, the second voltage is a forward pulse followed by a reverse pulse. In some embodiments, the second voltage is a forward pulse followed by a zero pulse followed by a reverse pulse. In some embodiments, a duration of the forward pulse is based on a material of the electrically conductive workpiece.

In some embodiments, a duration of the reverse pulse is based an amount of time to depassivate the electrically conductive workpiece. In some embodiments, a duration of the zero pulse is based on an amount of time to dissipate heat of the electrically conductive workpiece, replenish reacting species, remove reaction products, or any combination thereof.

In some embodiments, the first force is based on a material of the electrically conductive workpiece. In some embodiments, the second force is based on a material of the electrically conductive workpiece.

BRIEF DESCRIPTION OF THE DRAWINGS

The advantages of the invention described above, together with further advantages, may be better understood by referring to the following description taken in conjunction with the accompanying drawings. The drawings are not necessarily to scale; emphasis instead is generally placed upon illustrating the principles of the invention.

DETAILED DESCRIPTION OF THE INVENTION

Generally, the invention involves a method for electromechanical grinding. Electrochemical grinding combines mechanical grinding with electrochemical machining. A grinding wheel is bonded with a metal conductor (e.g., copper, brass and/or nickel). The metal conductor is negatively charged and behaves as a cathode. The workpiece is positively charged and behaves as an anode. An ion conducting electrolyte is positioned in a gap between the grinding wheel and the workpiece. The electromechanical grinding occurs in two phases. During the first phase, a first voltage is applied to the grinding wheel and a first force vector is applied from the grinding wheel towards the workpiece to remove a first desired percentage of material from the workpiece. Once the desired percentage of material is removed from the workpiece, a second voltage is applied to the grinding wheel, and a second force vector is applied from the grinding wheel towards the workpiece to remove a second percentage of material.

Figure 1:
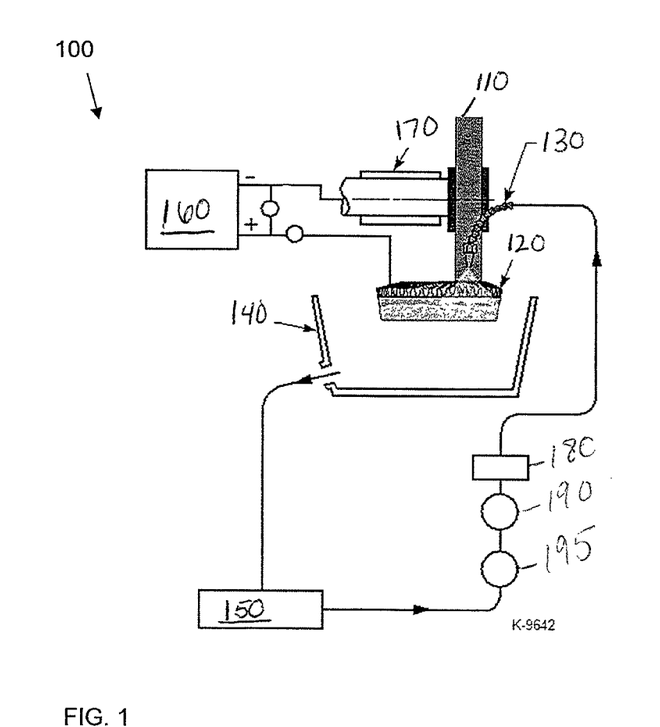
FIG. 1 is a schematic representation of an electromechanical grinding system, according to an illustrative embodiment of the invention.

FIG. 1 is a schematic representation of an electromechanical grinding system 100, according to an illustrative embodiment of the invention. The electromechanical grinding system 100 includes a grinding wheel 110, a workpiece 120, a nozzle 130, a work pan 140, a reservoir 150, an AC power supply 160, an insulator 170, a flow meter 180, a pump 190, and a clarifier 195.

The AC power supply 160 is in electrical communication with the grinding wheel 110 and the workpiece 120. The workpiece 120 is positioned inside of the work pan 140. The workpiece 120 is in fluid communication with an electrolyte inside of the work pan 140 and the electrolyte flowing out of the nozzle 130. The nozzle 130 is positioned near the grinding wheel 110 and the workpiece 120 at a location that allows the electrolyte flowing out of the nozzle 130 to flow into a gap that is between the grinding wheel 110 and the workpiece 120 and around the grinding wheel 110 and the workpiece 120.

The nozzle 130 is in fluid communication with the flow meter 180. The flow meter 180 is in fluid communication with the pump 190. The pump 190 is in fluid communication with the clarifier 195. The clarifier 195 is in fluid communication with the reservoir 150. The reservoir 150 is in fluid communication with the work pan 140.

During operation, alternating voltages and one or more grinding forces are applied to cause a physical and anodic electrochemical removal of material from the workpiece. The AC power supply 160 supplies a first voltage to the grinding wheel 110 and the grinding wheel 110 applies a first force towards the workpiece 120. The nozzle 130 sprays an electrolyte between and around the grinding wheel 110 and the workpiece 120.

The pump 190 pumps the electrolyte from the reservoir 150 through the flow meter 180, which controls the flow of the electrolyte, to the nozzle 130. The reservoir 150 receives the electrolyte from the work pan 140.

The first voltage is applied to the grinding wheel 110 and the first force applied towards the workpiece 120, an anodic electrochemical removal of material and a physical removal of material occur on the workpiece 120 at substantially the same time.

Figure 2:
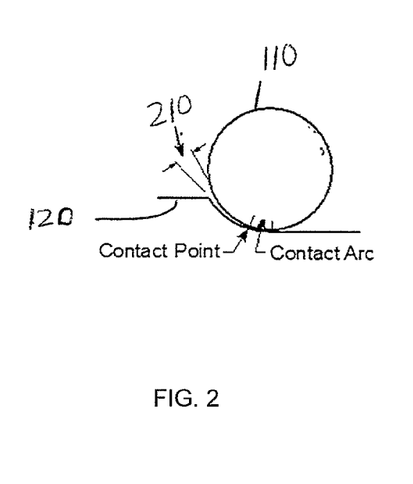
FIG. 2 is a schematic illustrating of a grinding wheel in contact with a workpiece according to an illustrative embodiment of the invention.

For example, turning to FIG. 2, an expanded view of contact between the grinding wheel 110 and the workpiece 120 is shown. In FIG. 2, the grinding wheel 110 has a point of contact 205 with the workpiece 120. A gap 210 exists between the grinding wheel 110 and the workpiece 120. The electrolyte flows through the gap 210. In this manner, an anodic electrochemical reaction and a physical grinding together cause removal of material from the workpiece.

Turning back to FIG. 1, once a desired amount of material is removed from the workpiece 110, a second force and a second voltage is applied to the workpiece 120. The second force can be substantially zero such that there is no contact between the grinding wheel 110 and the workpiece 120. With no contact between the grinding wheel 110 and the workpiece 120 and application of the second voltage to the workpiece 120, only an anodic electrochemical reaction removes material from the workpiece.

In some embodiments, during the time duration of the first voltage and the first force, ninety percent of the total material to be removed from the workpiece is removed. In some embodiments, during the time duration of the second voltage and the second force, ten percent of the total material to be removed from the workpiece is removed.

In various embodiments, the workpiece 120 is high strength steels, nickel and nickel alloys, titanium and titanium alloys, niobium and niobium alloys, molybdenum and molybdenum alloys, tungsten and tungsten alloys, and aluminum and aluminum alloys, chrome-copper alloys, cobalt-chrome alloys and/or tantalum-tungsten alloys.

Figure 3:
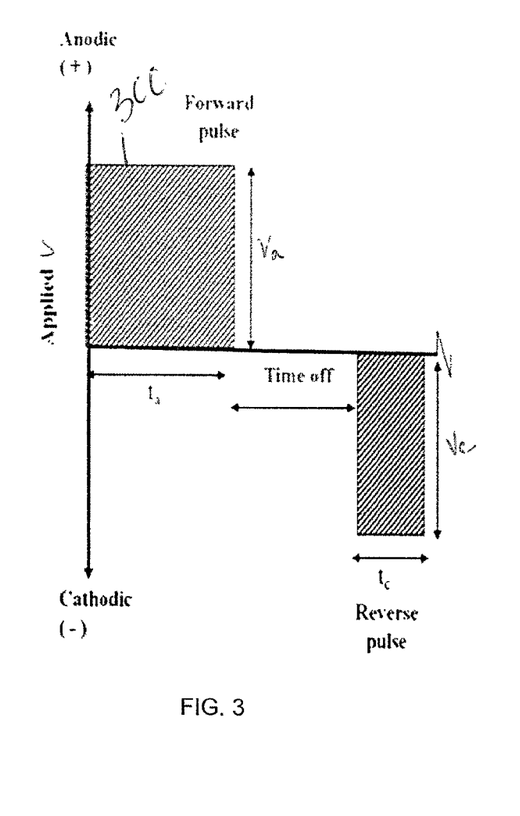
FIG. 3 is a graph of a waveform for an electromechanical grinding system, according to an illustrative embodiment of the invention.

FIG. 3 is a graph of a waveform 300 for an electromechanical grinding system (e.g., electromechanical grinding system 100, as described above in FIG. 1), according to an illustrative embodiment of the invention. The waveform 300 has three durations. During a first duration, $t_a$, a positive forward pulse (i.e., a positive anodic pulse) having a voltage amplitude $V_a$ is applied to a workpiece (e.g., workpiece 120 as described above in FIG. 2). During a second duration, time off, a zero pulse is applied. During a third duration, $t_c$, a reverse pulse (i.e., a negative cathodic pulse) having a voltage amplitude $V_c$ is applied. The cathodic pulse can be set to reduce oxide/depassivate a surface.

In some embodiments, the second duration is based on an amount of time it takes for heat dissipation, replenishing the reacting species, remove reaction products, or any combination thereof.

In various embodiments, the waveform 300 is any of the waveforms as shown in U.S. Pat. No. 6,558,231 to Taylor, the entire disclosure of which is herein incorporated by reference in its entirety. U.S. Pat. No. 6,558,321 shows examples of a two-step electrochemical process comprising a sequence of pulse/pulse reverse electric waveforms for electromachining. The two step process can be tuned to account for the beginning stages of the electromachining process where the surface roughness can be large and consequently the diffusion boundary follows or conforms to the surface profile and the later stages of the electromachining process where the diffusion boundary layer can be larger than the surface profile due to removal of surface asperities.

In some embodiments, the waveform 300 is any of the waveforms as shown in U.S. published Patent Application No. 2011/0303553 to Inman, the entire disclosure of which is herein incorporated by reference in its entirety. Inman shows the use of pulse/pulse reverse process for electrochemical machining of metals and alloys that form strongly passive surface layers. The process of Inman can be useful for electrochemical material removal from strongly passive work pieces including electrochemical machining or electrochemical polishing or electrochemical through-mask etching or electrochemical deburring and the like. The process can use aqueous sulfuric acid solutions.

In some embodiments, the waveform 300 is any of the waveforms as shown in U.S. Pat. No. 6,402,931 to Zhou, the entire disclosure of which is herein incorporated by reference in its entirety. Zhou shows a pulse/pulse reverse process for electrochemical machining of metals and alloys that form passive surface layers. The process can be useful for electrochemical material removal from passive work pieces including electrochemical machining or electrochemical polishing or electrochemical through-mask etching or electrochemical deburring. The process can use aqueous salt solutions of sodium nitrate and/or sodium chloride.

Figure 4A:
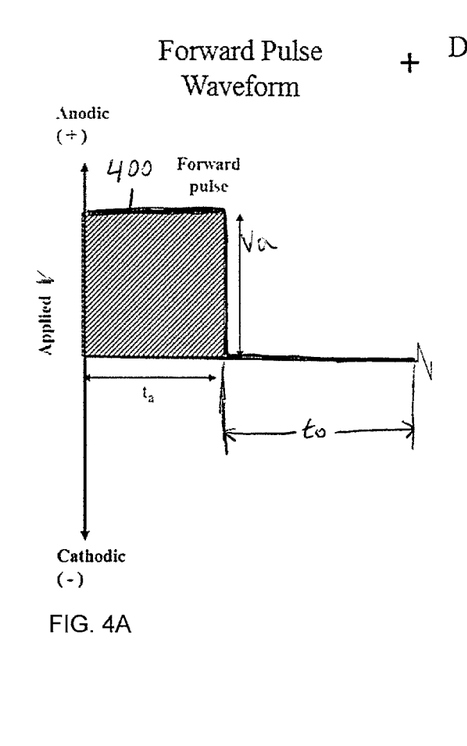
FIG. 4A is a graph of a waveform for an electromechanical grinding system during a first duration, according to an illustrative embodiment of the invention.
Figure 4B:
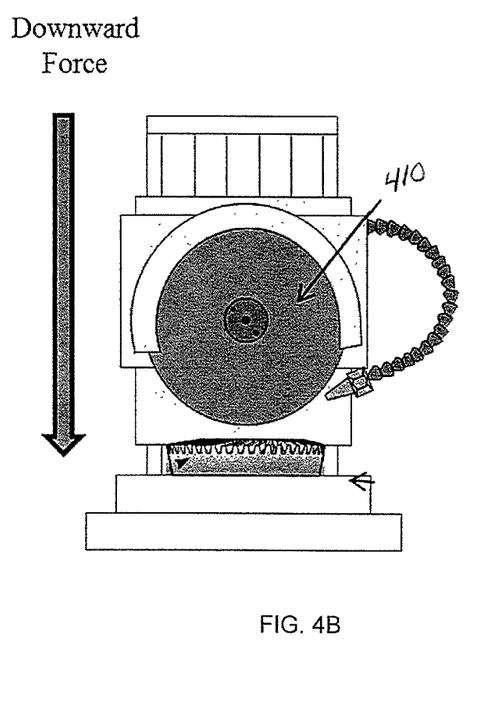
FIG. 4B is a schematic illustration of a force for the electromechanical grinding system of FIG. 4A during the first duration, according to an illustrative embodiment of the invention.

FIG. 4A is a graph of a waveform 400 for an electromechanical grinding system during a first duration, $t_a$, and a second duration, $t_o$, according to an illustrative embodiment of the invention. During the first duration, $t_a$, a forward pulse having a voltage amplitude, $V_a$, is applied to a workpiece (e.g., the workpiece 120, as shown above in FIG. 1). At the same time, a first force is applied by an electrochemical grinding wheel 410 toward the workpiece. FIG. 4B is a schematic illustration of the first force for the electromechanical grinding system of FIG. 4A, according to an illustrative embodiment of the invention. Once a predetermined amount of material is removed from the workpiece, the first duration, $t_a$, ends, and the second duration, $t_o$, begins. During the second duration, the waveform 400 transitions to a substantially zero voltage amplitude and the force from the electrochemical grinding wheel 410 towards the workpiece is substantially zero.

Figure 5A:
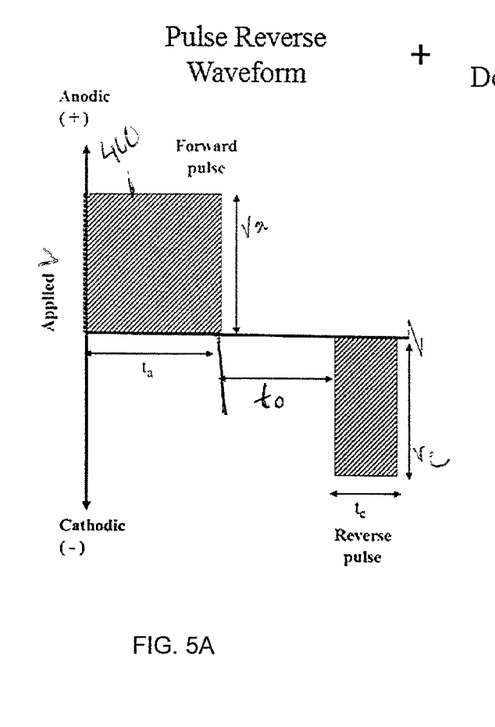
FIG. 5A is a graph of a waveform for an electromechanical grinding system during a second processing phase, according to an illustrative embodiment of the invention.
Figure 5B:
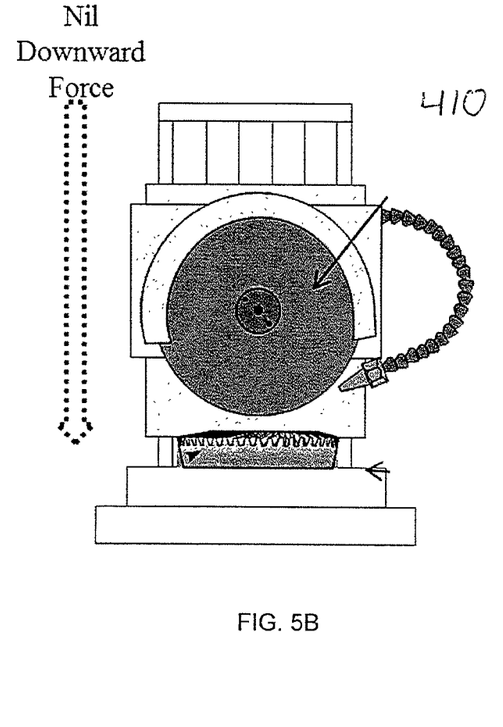
FIG. 5B is a schematic illustration of a force for the electromechanical grinding system of FIG. 5A during the first duration, according to an illustrative embodiment of the invention.

FIG. 5A is a graph of a waveform 400 for the electromechanical grinding system of FIG. 4B during a third duration, $t_c$, according to an illustrative embodiment of the invention. During the third duration, $t_c$, a reverse pulse having a voltage amplitude, $i_c$, is applied to the workpiece. At the same time a second force that is substantially zero is applied from the electrochemical grinding wheel 410 toward the workpiece. FIG. 5B is a schematic illustration of the force for the electromechanical grinding system of FIG. 5A, according to an illustrative embodiment of the invention.

Figure 6:
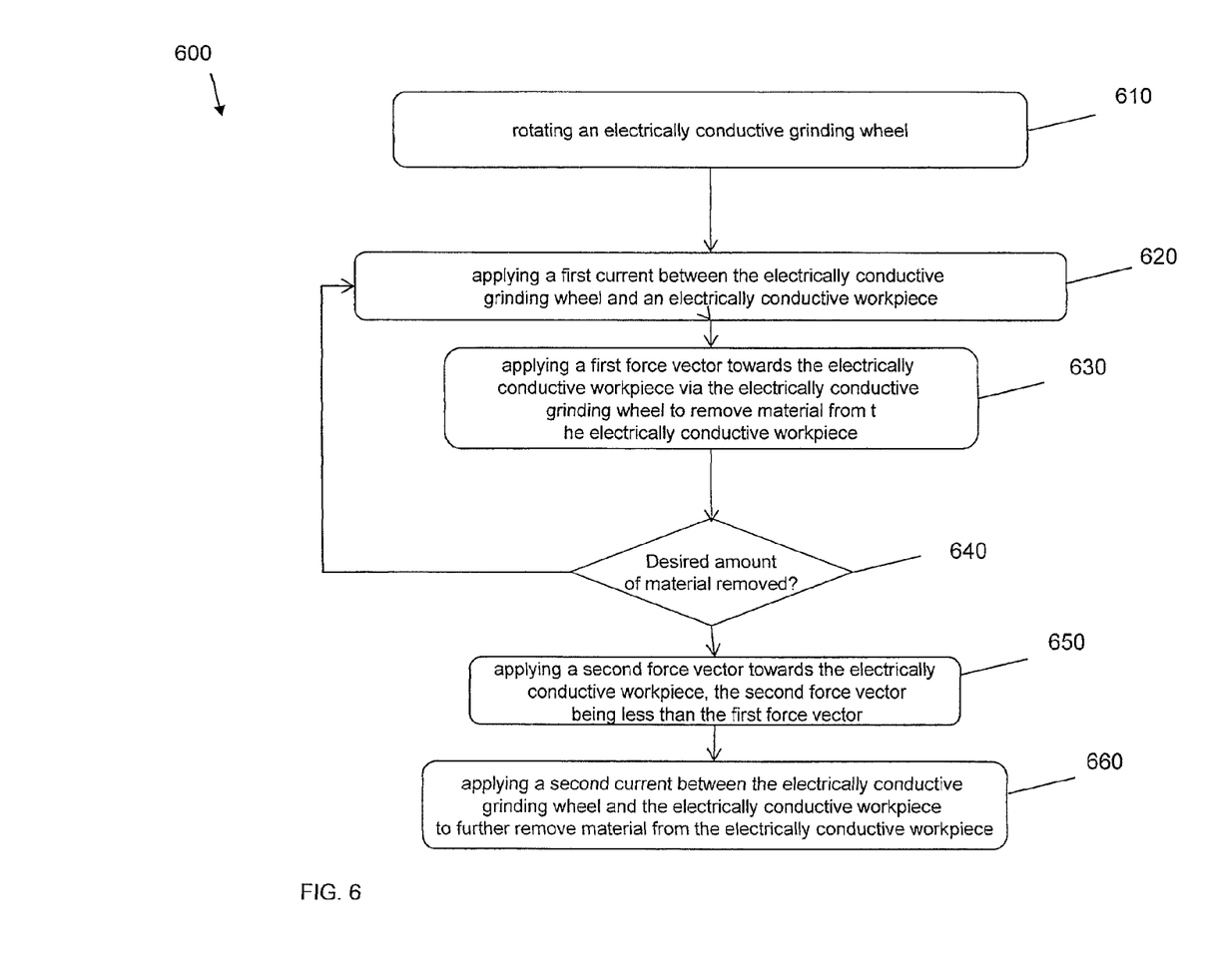
FIG. 6 is a flow diagram exhibiting a method for electromechanical grinding, according to an illustrative embodiment of the invention.

FIG. 6 is a flow diagram exhibiting a method 600 for electromechanical grinding, according to an illustrative embodiment of the invention.

The method involves rotating an electrically conductive grinding wheel (step 610), for example electrically conductive grinding wheel 110 as shown above in FIG. 1.

The method also a involves applying first voltage between the electrically conductive grinding wheel and an electrically conductive workpiece (step 620), for example workpiece 120, as shown above in FIG. 1. In some embodiments the first voltage is a positive anodic voltage, for example, $i_a$ as shown above in FIG. 3.

The method also involves applying a first force vector towards the electrically conductive workpiece of the electrically conductive grinding wheel to remove material from the electrically conductive workpiece (step 630).

The method also involves determining whether a desired amount of material has been removed (step 640). The determination can be based on taking a weight of the electrically conductive workpiece. The determination can be based on an amount of time that the workpiece has been under the influence of the forward pulse and the first force vector. If the desired amount of material has not been removed then steps 620 and 630 continue. If the desired amount of material has been removed, then the method involves applying a second force vector towards the electrically conductive workpiece (step 650). The second force vector is less than the first force vector. In some embodiments, the second force vector is zero.

The method also involves applying a second voltage between the electrically conductive grinding wheel and the electrically conductive workpiece to further remove material from the electrically conductive workpiece (step 660).

In various embodiments, the method 500 is used for the production of helicopter engines, artillery projectiles, large caliber cannons, turbine cooling technology and/or gun barrels.

While the invention has been particularly shown and described with reference to specific embodiments, it should be understood by those skilled in the art that various changes in form and detail may be made therein without departing from the spirit and scope of the invention as defined by the appended claims.

What is claimed is:

1. A method for electromechanical grinding comprising:
   rotating an electrically conductive grinding wheel;
   applying a first voltage between the electrically conductive grinding wheel and an electrically conductive workpiece;
   applying a first force vector towards the electrically conductive workpiece via the electrically conductive grinding wheel to remove material from the electrically conductive workpiece; and
   after removing a desired percentage of material from the electrically conductive workpiece: a) applying a second force vector towards the electrically conductive workpiece, the second force vector being less than the first force vector, and b) applying a second voltage between the electrically conductive grinding wheel and the electrically conductive workpiece to further remove material from the electrically conductive workpiece.

2. The method of claim 1 wherein the first voltage is a forward direct voltage or a forward pulse voltage.

3. The method of claim 1 wherein the second voltage is a forward pulse followed by a reverse pulse.

4. The method of claim 1 wherein the second voltage is a forward pulse followed by a zero pulse followed by a reverse pulse.

5. The method of claim 3 or 4 wherein a duration of the forward pulse is based on a material of the electrically conductive workpiece.

6. The method of claim 3 or 4 wherein a duration of the reverse pulse is based an amount of time to depassivate the electrically conductive workpiece.

7. The method of claim 4 wherein a duration of the zero pulse is based on an amount of time to dissipate heat of the electrically conductive workpiece, replenish reacting species, remove reaction products, or any combination thereof.

8. The method of claim 1 wherein the first force vector is based on a material of the electrically conductive workpiece.

9. The method of claim 1 wherein the second force vector is based on a material of the electrically conductive workpiece.

10. The method of claim 1 wherein roughness average of the workpiece after the electromechanical grinding is about 8 micro-inches, about 4 micro-inches or less than or equal to 1 micro-inch.

11. The method of claim 1 wherein the desired percentage of material removal is about 90%, 95% or 99% material removal.

* * * * *